C. G. LUNDGREN.
CAM INDEXING DEVICE.
APPLICATION FILED MAY 6, 1911.
1,008,838.
Patented Nov. 14, 1911.
2 SHEETS—SHEET 1.
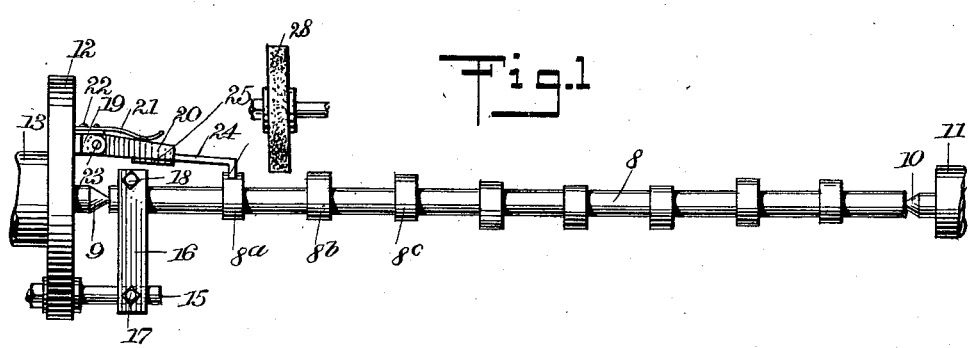
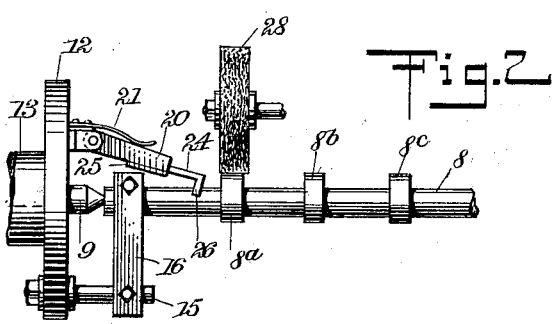
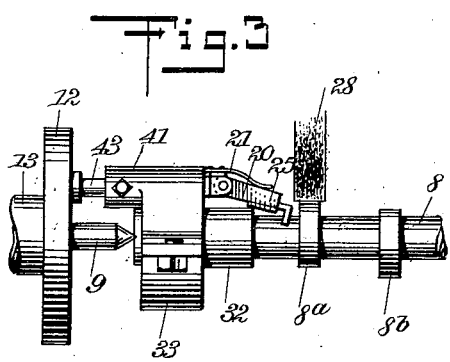
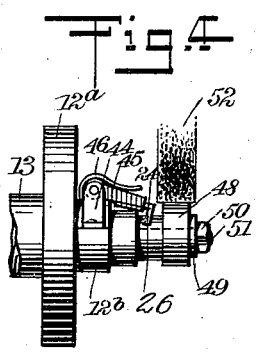
WITNESSES:
Johna Bergethou
Walton Harrison
INVENTOR
Carl G. Lundgren
BY
ATTORNEYS

UNITED STATES PATENT OFFICE.

CARL GUSTAF LUNDGREN, OF CHICAGO, ILLINOIS.

CAM-INDEXING DEVICE.

1,008,838.  Specification of Letters Patent.  Patented Nov. 14, 1911.

Application filed May 6, 1911. Serial No. 625,421.

*To all whom it may concern:*

Be it known that I, CARL G. LUNDGREN, a citizen of the United States, and a resident of Chicago, in the county of Cook and State of Illinois, have invented a new and Improved Cam-Indexing Device to be Used on Lathes and Grinders or Milling-Machines, of which the following is a full, clear, and exact description.

My invention relates to gaging, indexing or setting devices, used upon a lathe milling machine or grinding machine in connection with the turning, milling or grinding of cams.

More particularly stated, my invention comprehends an attachment of special adaptability for a lather milling machine or grinding machine adapted to carry a smooth cam-shaft, *i. e.*, one not provided with a keyway, and upon which one or more cams are surmounted that they may be readily turned, milled, ground or otherwise dressed or machined by aid of the rotation of the shaft upon which the cams are mounted.

A special purpose of my improvement in connection with the machines just mentioned is to facilitate the accurate and rapid measurement of the position occupied by the cam, the measuring device being then quickly moved out of the way, yet remaining closely associated with the cam shaft and practically carried by the latter. In this connection it will be noted that where a number of cams is mounted upon the same shaft and is to be dressed, turned, milled, ground, or otherwise dressed for the machine by aid of rotation of the shaft upon which the cams are mounted, the dressing tools are, by aid of automatic mechanism, arranged for the purpose, periodically moved inward and outward as the cam shaft is turned and it is, therefore, quite essential that the adjustment of the cam shaft, relatively to its mountings, shall be quite accurate, some one of the cams being set truly in position, the rest of the cams, of course, being brought properly into position by virtue of their rigid connection with the shaft and with the cam thus adjusted.

Reference is to be had to the accompanying drawings forming a part of this specification, in which like characters of reference indicate corresponding parts in all the views, and in which—

Figure 5:
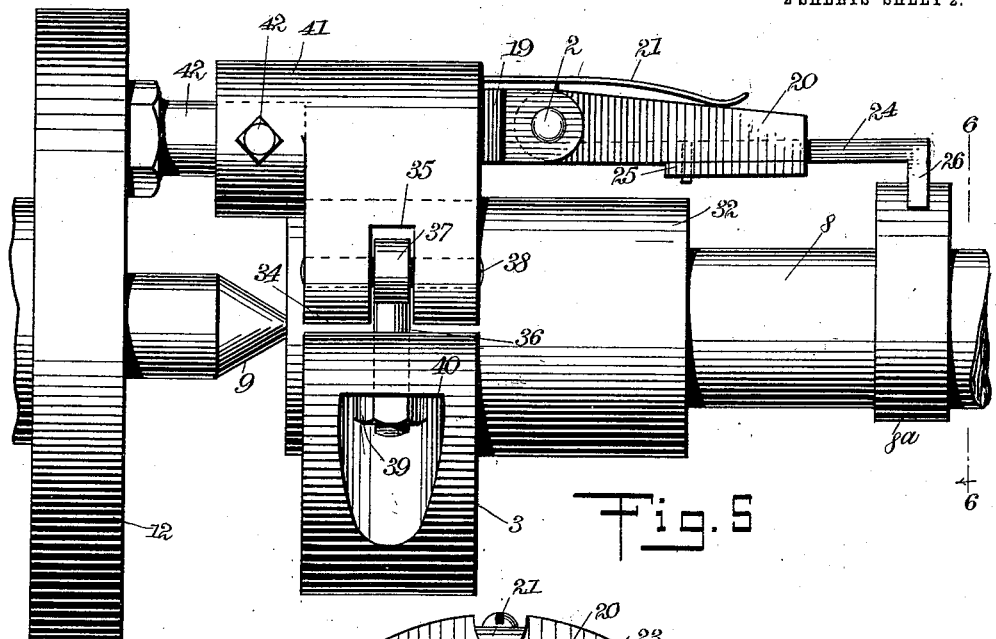
Figure 6:
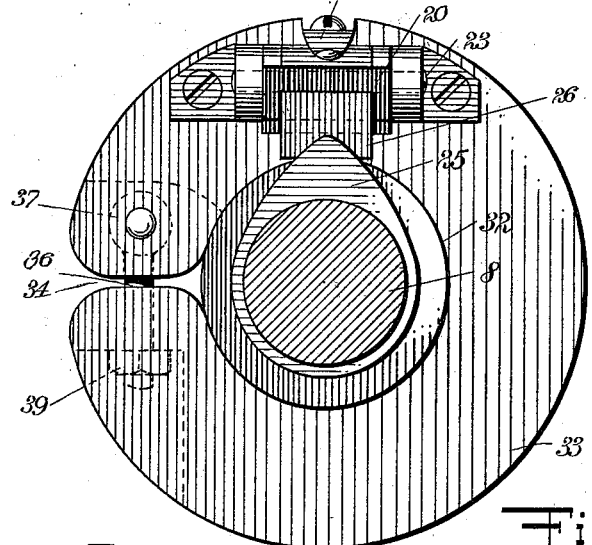
Figure 7:
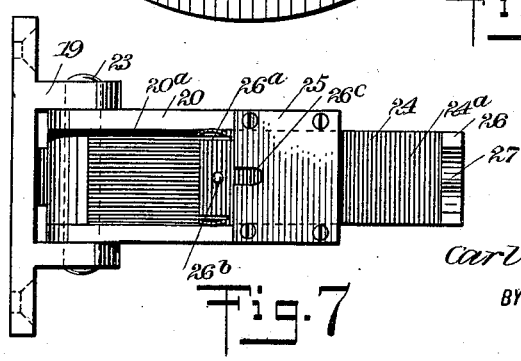

Figure 1 is a fragmentary front elevation showing my gaging attachment applied to a cam shaft locked in a lathe by aid of a dog; Fig. 2 shows the mechanism substantially as it appears in Fig. 1, but with the gage removed and the grinding wheel at work; Fig. 3 is a view somewhat similar to Figs. 1 and 2, but showing the cam shaft supported in the lathe by aid of a different type of dog, upon which the gaging attachment is directly mounted; Fig. 4 shows a slightly different form of my gaging attachment which, in this instance, is mounted for use in connection with a short screw arbor carrying a single cam; Fig. 5 is a detail showing most of the mechanism appearing in Fig. 3, and also showing the manner in which the position of a cam is gaged by aid of my invention; Fig. 6 is a vertical cross section on the line 6—6 in Fig. 5, looking in the direction of the arrow, and Fig. 7 is a detail, showing an inverted plan, or bottom view, of the templet and parts adjacent thereto, used for the purpose of gaging.

A cam shaft 8 is centered upon pointed stub shafts 9, 10 and adapted to turn. Mounted fixedly upon the cam shaft are cams $8^a$, $8^b$, $8^c$. The stub shaft 10 is supported within a cylindrical bearing 11. The stub shaft 9 extends through a revoluble face plate 12 having generally a disk-like form. A bearing 13 supports the face plate 12 and parts carried by it. Extending through the face plate 12 and projecting laterally therefrom is a pin 15. A dog 16 is connected with this pin by aid of a bolt 17. The dog is also connected with the cam shaft 8 by aid of a bolt 18.

Mounted upon the face plate 12 is a yoke 19. A lever 20 extends outwardly from this yoke and is engaged by a leaf spring 21, the latter being secured to the yoke 19 by aid of fastenings 22. A pivot pin 23 extends through the yoke 19 and lever 20, the lever thus being mounted to rock upon the pivot pin as a center. A cover plate 25 is secured to the underside of the lever 20 and retains the gage 24 within a groove $20^a$. The lever 20 is provided on its under side with the groove $20^a$, as will be readily understood from Fig. 7. Slidably fitted into this groove is the gage 24 or measuring tongue made of metal and provided with a downturned saddle-like portion 26 having a central indentation 27, and serving generally the purpose of a templet. The gage 24 is further provided with spring fingers 26ª integral with it and preferably formed by striking up and partially severing portions of the metal and turning these portions slightly, as indicated in Fig. 7. The gage 24 carries a pin 26ᵇ which is adapted to fit into a slot 26ᶜ, with which the cover plate 25 is provided. A grinding wheel 28 is moved away from the cams when indexing or adjusting the shaft as herein described, and when changing from one cam to the next. This fixture does not provide for the reciprocal movement of the grinding wheel or of the head and tail stocks of the machine, as this is provided for in the grinding machine, milling machine, or lathe used. This fixture also does not provide for the varying shapes and varying positions or angles on the shaft at which the different cams are designed to be located, as this feature is also provided for in the grinding machine, milling machine, or lathe used.

In the form of the lathe shown in Fig. 2, power is applied to the face plate 12. In Fig. 3 I show the cam shaft 8 as supported at one of its ends by a sleeve 32, of cylindrical form, encircling it. In Fig. 3 the cam shaft is driven by a collar 33, which is of a general annular conformity, and is provided with an open slot 34, Fig. 6, into which merges another slot 35, Fig. 5. A bolt 36 is provided with an annular bearing portion 37 which extends into the slot 35. A pivot pin 38 extends through the bearing portion 37 and thus supports the bolt upon the collar 33. One end of the bolt is threaded, and fitted upon this end is a nut 39. The collar 33 is cut away and thus provided with a shoulder 40 against which the nut 39 is adapted to lodge so as to grip the collar firmly upon the sleeve 32 as will be understood from Fig. 6. The collar 33 carries a bearing 41, Fig. 5, of substantially cylindrical form integral with it. A set screw 42 extends through the bearing 41. A pin 43 is mounted upon the face plate 12 and extends directly therefrom into the bearing 41 so that this pin is engaged by the set screw 42. When the face plate 12 is rotated, the collar 33 is turned, carrying with it the sleeve 32 and causing the cam shaft 8 to rotate.

In the form of my device shown in Fig. 4 the face plate 12ª is provided with a hub portion 12ᵇ and mounted upon the latter is a bearing bracket 44. The lever 45 is pivotally mounted upon this bearing bracket. A leaf spring 46 is secured to the bearing bracket and bent over the lever 45 so as to press the same downwardly, according to this figure. A templet 26 and the gage 24 bearing the same have the form above described. According to Fig. 4 the cam 48 is mounted upon a very short cam shaft 49 by aid of a nut 50 which is fitted upon a reduced portion 51 of the short cam shaft. The grinding wheel for dressing the cam 48 is shown at 52.

The operation of my device is as follows: Suppose that, according to Figs. 1, 2 and 3, the operator desires to locate the cam 8ª as to its position relatively to the shaft 8. The lever 20, I will say, occupies at the start its normal position which is indicated in Fig. 2. The templet 26 is now resting upon the cam shaft 8, and if the lathe is in operation the templet, and, indeed, all parts of the attachment, rotate freely with the cam shaft. The lathe being stopped, the operator grasps the gage 24 and draws it out until templet 26 rests upon the cam 8ª. The operator, by observing the fit of the templet, can ascertain when the cam is in its proper angular position relatively to the lathe. When the shaft is in a position so that the templet fits well, the screw 18, as in Figs. 1 and 2, or the nut 39 in Fig. 5, is tightened, the templet 26 is withdrawn and out of the way of the grinding wheel and the grinding wheel or the milling cutter is advanced to the work.

The course of procedure relative to the type of my device shown in Fig. 4 will be readily understood from the foregoing description. The grinding wheel 52 is analogous to the grinding wheel 28, and the position of the cam is readily determined by merely drawing out the gage 24 so as to rest the templet upon the cam.

Having thus described my invention, what I claim as new and desire to secure by Letters Patent is:—

1. A gaging attachment for lathes comprising a revoluble member, means for locking to said revoluble member a cam shaft provided with a cam, a lever journaled upon said revoluble member, a gage slidably mounted upon said lever, and a templet carried by said gage for the purpose of engaging said cam.

2. A gaging attachment for lathes comprising a revoluble member, means for locking relatively to said revoluble member a cam shaft carrying a cam, a lever journaled upon said revoluble member and adapted to swing radially inward, a gage connected with said lever, and a templet carried by said gage and provided with a surface for engaging said cam.

3. A gaging attachment comprising a bearing detachably mounted upon a revoluble member of a lathe, a lever pivotally connected with said bearing and adapted to swing toward and from the axis of rotation of said revoluble member, a gage carried by said lever and extensible in the general direction of the axis of rotation of said revoluble member, and means for normally pressing said lever toward the said axis of rotation.

4. In a device of the character described, the combination of a revoluble member, a lever carried thereby and adapted to swing toward and from the axis of rotation thereof, said lever being provided with a groove, a longitudinal gage provided with a templet and slidably mounted within said groove, a cover plate engaging said lever and retaining said gage within said groove, and a spring carried by said revoluble member and engaging said lever.

5. A device of the character described comprising a revoluble member, a lever carried thereby and adapted to swing toward and from the axis of rotation of said revoluble member, a gage slidably mounted upon said lever and provided with a templet, and a spring carried by said revoluble member and engaging said lever for pressing the latter toward the axis of rotation of said revoluble member.

6. A device of the character described comprising a revoluble member, a bearing carried thereby, a lever journaled upon said bearing and provided with a groove, a cover plate mounted upon said lever and covering said groove, a longitudinal gage carried by said lever and located within said groove, said gage being provided with an end extending from said lever and provided with a templet, and a leaf spring carried by said revoluble member and engaging said lever.

In testimony whereof I have signed my name to this specification in the presence of two subscribing witnesses.

CARL GUSTAF LUNDGREN.

Witnesses:
BERTHA SCHREIBER,
GRACE BROWN.

---

Copies of this patent may be obtained for five cents each, by addressing the "Commissioner of Patents, Washington, D. C."